United States Patent [19]

Walker et al.

[11] 3,870,482

[45] Mar. 11, 1975

[54] PROCESS FOR THE SEPARATION OF $C_4$ ACETYLENIC HYDROCARBONS FROM GAS STREAMS

[75] Inventors: David G. Walker, Baytown; Donald A. Keyworth, Houston; Jerome R. Sudduth, Pasadena, all of Tex.

[73] Assignee: Tenneco Chemicals, Inc., Saddle Brook, N.J.

[22] Filed: Sept. 19, 1973

[21] Appl. No.: 398,678

[52] U.S. Cl............................................ 55/62, 55/63
[51] Int. Cl.............................................. B01d 53/04
[58] Field of Search............ 55/59, 62, 63, 74, 179, 55/387; 260/677 A, 679 A

[56] References Cited
UNITED STATES PATENTS 3,706,181  12/1972   Walker et al. .......................... 55/63
3,728,844  4/1973   Snyder et al. .......................... 55/33

*Primary Examiner*—Charles N. Hart
*Attorney, Agent, or Firm*—Evelyn Berlow

[57] ABSTRACT

Diacetylene and vinylacetylene are separated from gas streams that contain from 1 to 10 mole percent of these compounds by contacting the gas stream with activated carbon the surface of which has been saturated with an inert, non-explosive gas that has carbon adsorption characteristics similar to those of the $C_4$ acetylenic compounds until the surface of the carbon is saturated with adsorbed $C_4$ acetylenic compounds. A stream of inert gas is used to strip the $C_4$ acetylenic compounds from the carbon.

14 Claims, No Drawings

PROCESS FOR THE SEPARATION OF C4 ACETYLENIC HYDROCARBONS FROM GAS STREAMS

This invention relates to a process for the safe handling and separation of acetylenic hydrocarbons that have 3 or 4 carbon atoms.

The high temperature pyrolysis of hydrocarbons yields acetylene, hydrogen, carbon dioxide, carbon monoxide, and small amounts of other unsaturated hydrocarbons that contain from 2 to 10 or more carbon atoms. The unsaturated hydrocarbons that have 3 or 4 carbon atoms, that is methylacetylene, allene, diacetylene, and vinylacetylene, are generally present in the pyrolysis gas streams in the amount of about 5 percent to 10 percent, based on the weight of acetylene in the gas stream. After removal of the acetylene from them, the gas streams contain about 1 percent to 10 percent by weight of the $C_3$ and $C_4$ acetylenic compounds.

While the $C_3$ and $C_4$ acetylenic compounds are potentially valuable as reactants in the manufacture of a number of chemical products, they have not been used to any appreciable extent in these applications because of the difficulties and hazards involved in isolating them from the gas streams. The concentration of these compounds in the gas streams and their separation by fractional distillation procedures are dangerous to carry out because diacetylene is extremely sensitive and can decompose explosively in the gas phase at temperatures above $-20°C$. Its critical pressure for explosion is only 0.041 atmosphere absolute. It has been reported that this critical pressure can be raised to about 1 atmosphere absolute by diluting the diacetylene with a sizeable amount of a non-explosive inert gas, such as ammonia, carbon dioxide, sulfur dioxide, nitrogen, propane, butane, butylene, and the like. The resulting gas streams that contain less than about 10 percent by weight of the acetylenic compounds do not deflagrate even at extremely high total gas pressures and temperatures. Attempts to use the acetylenic compounds in these dilute gas streams as reactants have been unsuccessful because of problems involving catalysts and other reactants caused by the inadequate residence times of the acetylenic compounds in the reaction vessel. For their use as reactants to be practical, the $C_3$ and $C_4$ acetylenic compounds should be made available with as little diluent gas as is consistent with safety.

In U.S. Pat. No. 3,706,181, Walker and Keyworth disclosed a process for the safe handling, concentration, and purification of $C_3$ and $C_4$ acetylenic hydrocarbons. In this process a gas stream that contains 10 mole percent or less of these compounds is passed through a bed of activated carbon until the surface of the carbon is saturated with adsorbed acetylenic compounds having three or four carbon atoms. A stream of inert gas is passed through the bed of saturated activated carbon to desorb the acetylenic compounds and form a gas stream that contains 30 to 50 mole of the acetylenic compounds. To improve the safety of the process, the gas stream can be diluted with an inert, non-explosive gas that has carbon adsorption characteristics similar to those of the $C_4$ acetylenic compounds prior to the treatment of the activated carbon with the gas stream.

When $C_4$ hydrocarbons are adsorbed on activated carbon, there is a release of sufficient energy to increase the temperature of the carbon bed by about 60° to 130°C. Such an increase in the temperature of the activated carbon is sufficient to initiate thermal polymerization of the diacetylene and vinylacetylene that are adsorbed on the carbon. The polymerization reaction, which is exothermic, causes a further increase in the temperature of the carbon bed. Since the polymers formed reduce the adsorptive capacity of the carbon and also reduce the amount of diacetylene and vinylacetylene that can be recovered from the carbon, it is advantageous to prevent or to minimize the evolution of heat during the passage through the carbon bed of a gas stream containing $C_4$ acetylenic compounds.

In the process disclosed in U.S. Pat. No. 3,706,181, it is necessary to use large amounts of refrigeration to remove the heat of adsorption that is evolved and to maintain the activated carbon at a temperature at which polymerization of diacetylene and vinylacetylene does not occur to an appreciable extent. In addition this process does not always provide the desired clean separation of diacetylene and vinylacetylene from the $C_2$ and $C_3$ acetylenic hydrocarbons in the gas stream.

In accordance with the present invention, an improved process has been developed for the safe handling, concentration, and purification of $C_3$ and $C_4$ acetylenic hydrocarbons. This process, which does not require the use of large amounts of refrigeration to maintain the carbon bed at a temperature at which the $C_4$ acetylenic compounds do not polymerize, yields gas streams that contain $C_4$ acetylenic hydrocarbons contaminated with little or no $C_3$ compounds.

In this process, activated carbon is treated with an inert, non-explosive gas that has carbon adsorption characteristics similar to those of the $C_4$ acetylenic compounds until the surface of the carbon is saturated with the inert gas. Since the inert gas does not undergo polymerization, the heat evolved during this treatment of the carbon is only the heat of adsorption of the inert gas. The activated carbon that has been presaturated with the inert gas is cooled to the desired operating temperature, and a gas stream that contains 1 to 10 mole percent of $C_4$ acetylenic hydrocarbons is passed through it until a major portion of the adsorbed inert gas has been displaced by the $C_4$ acetylenic hydrocarbons in the gas stream and $C_4$ acetylenic hydrocarbons appear in the effluent gas.

The conditions under which this process is carried out are not critical provided that the temperature of the presaturated carbon is below about 40°C. It is generally most convenient to carry out the treatment of the presaturated carbon with the gas stream at atmospheric pressure and at ambient temperature. If desired, other temperatures and pressures can be used. The process is ordinarily carried out by passing the gas stream through standard carbon-packed columns. A plurality of columns is preferably used so that the carbon in one column can be stored, transported, stripped, or otherwise used while another column is on stream.

During the passage of the gas stream through the bed of presaturated carbon, there is very little rise in the temperature of the carbon bed and substantially no loss of $C_4$ acetylenic hydrocarbons due to polymerization. Because the $C_3$ acetylenic hydrocarbons in the gas stream cannot displace the inert gas with which the carbon has been presaturated, these compounds pass through the bed of presaturated carbon; they may if desired be absorbed by a second bed of activated carbon.

When the acetylenic compounds are desorbed from the saturated activated carbon, the gas stream obtained contains the $C_4$ acetylenic hydrocarbons in the same ratio as in the original gas stream; it contains only very small amounts of $C_3$ compounds.

In the practice of this invention, the activated carbon is saturated before it is brought into contact with the gas stream with a stable, non-explosive compound that is non-reactive toward the acetylenic compounds and that has an affinity for carbon adsorption that is similar to that of diacetylene and vinylacetylene. The compounds that can be used to presaturate the activated carbon preferably have distribution numbers of about 0.4 to 3.0 for diacetylene and vinylacetylene. The distribution numbers are obtained by measuring the distribution of the compounds between activated carbon and the gas phase and using the following equation:

$\alpha$ for $C_4H_2$ = [$C_4H_2$ on carbon] [inert compound in gas phase]/[$C_4H_2$ in gas phase] [inert compound on carbon]

Illustrative of the inert compounds that can be used in the practice of this invention are the following:

| | $\alpha$ for Diacetylene | $\alpha$ for Vinylacetylene |
|---|---|---|
| Isopentane | 0.59 | 0.48 |
| Ethyl chloride | 1.45 | 1.59 |
| n-Butane | 2.0 | 1.85 |
| 2,2-Dimethylpropane | 2.94 | 2.95 |

It is preferred that the activated carbon be presaturated with n-butane.

The presaturation of the activated carbon with n-butane or another inert compound can be effected by passing a gas stream containing the inert compound through the carbon bed until the surface of the carbon is saturated and the inert compound appears in the effluent gas. To minimize the rise in the temperature of the carbon bed due to evolution of heat adsorption, the inert compound may be diluted with nitrogen or another gas that is not adsorbed by the carbon to form a gas stream that contains 1 to 5% of the inert compound before it is introduced into the bed of activated carbon, and the gas stream containing the inert gas may be cooled to a temperature that is 20°C. or more below the desired operating temperature before it is passed into the carbon bed. Alternatively, the inert compound may be introduced as a liquid into the bed of activated carbon and allowed to evaporate. The presaturated carbon, whose temperature has risen as the result of evolution of the heat of adsorption of the inert compound, is cooled to a temperature in the range of about 25° to 60°C., and preferably 30° to 40°C., for example, by passing cold nitrogen through it.

In a preferred procedure for the presaturation of the activated carbon, liquid n-butane is introduced into the bed of activated carbon and allowed to evaporate. The temperature of the carbon, which rises to about 125°C. as the heat of adsorption of n-butane is evolved, falls to about 75° to 80°C. as n-butane gas leaves the carbon bed. The bed is then cooled to 30° to 40°C., for example, by passing cold nitrogen through it. Additional liquid n-butane is introduced into the carbon bed. The temperature of the bed, which rises to about 40° to 50°C. as the result of further evolution of heat of adsorption, is again lowered to 30° to 40°C. with cold nitrogen. In this way a bed of activated carbon that is saturated with n-butane at 30° to 40°C. is obtained in a shorter time than is possible when other procedures are used to presaturate the activated carbon with n-butane. A further advantage of this presaturation procedure is that it yields saturated activated carbon at 30° to 40°C., whose capacity for $C_4$ hydrocarbons is about 10 percent, whereas when the carbon is saturated with these compounds at higher temperatures, its adsorptive capacity is lower. For example, the capacity of activated carbon for adsorbed $C_4$ hydrocarbons at 65°C. is about 6 percent.

When a gas stream that contains 1 to 10 percent of $C_4$ acetylenic hydrocarbons is passed through a bed of activated carbon that has been presaturated with n-butane by the preferred presaturation procedure, the rise in temperature of the carbon bed as the $C_4$ acetylenic compounds displace the adsorbed n-butane is usually less than about 5°C.

In another embodiment of the invention, the process is used to remove $C_3$ and $C_4$ acetylenic hydrocarbons from a gas stream that contains 1 to 10 mole percent of these compounds and to separate the $C_3$ hydrocarbons from the $C_4$ hydrocarbons. In this modified procedure, a gas stream that contains 1 to 10 mole percent of $C_3$ and $C_4$ acetylenic hydrocarbons is passed into a first bed that contains activated carbon that has been presaturated with n-butane or another inert, non-explosive compound that has carbon adsorption characteristics similar to those of the $C_4$ acetylenic compounds. The gas leaving the first bed is passed into a second bed of activated carbon that has not been presaturated with the inert compound until the surface of the carbon in the first bed is saturated with $C_4$ acetylenic hydrocarbons (diacetylene and vinylacetylene) and the surface of the carbon in the second bed is saturated with $C_3$ hydrocarbons (methylacetylene and allene). The $C_3$ and $C_4$ compounds are recovered by passing inert gas, such as steam or a stream of nitrogen saturated with methylene chloride at ambient temperature, through the beds of saturated carbon.

While the aforementioned processes provide safe and efficient means of handling acetylenic hydrocarbons and separating $C_3$ and $C_4$ acetylenic hydrocarbons from gas streams, occasionally the conditions under which the acetylenic compounds are desorbed from the carbon are such that there is local overheating and a mild deflagration of the gas mixture occurs. To eliminate the possibility that the acetylene compounds in the gas stream will deflagrate during handling or storage, the gas stream may be diluted with an inert, non-explosive compound that has approximately the same affinity for carbon as the $C_4$ acetylenic hydrocarbons. The gas stream is ordinarily mixed with about 30 to 70 percent of its weight, and preferably about 45 to 60 percent of its weight, of the diluent. The inert, non-explosive compound with which the gas stream is diluted is usually and preferably the same inert compound as that with which the activated carbon is presaturated, but if desired a different inert diluent can be used. In most cases the diluent is n-butane.

The activated carbons that can be used in the process of this invention are prepared by heating a carbonaceous material of vegetable, animal, or mineral origin at temperatures above 400°C. until the material is completely carbonized. Among the materials from which the activated carbons may be prepared are coal, coconut sheels, wood dust, peat, petroleum residues, and the like. The carbon should have an initial adsorption capacity for carbon tetrachloride at ambient temperatures of at least 8 percent, since those of lower capacity are deactivated too rapidly to be economically practical. High surface area carbons that have an initial adsorption capacity for carbon tetrachloride of 50 percent or more are not ordinarily used in the practice of this invention because they add to the cost of the process without providing a corresponding improvement in its efficiency. The activated carbon is usually employed as a finely-divided power having a particle size of about 10 to 200 mesh. Particularly good results have been obtained using activated carbon prepared by heating coal in steam at 700°–900°C. One such material, which is marketed as Pittsburgh Type SGL, has the following characteristics:

| | |
|---|---|
| Particle Size | 8 × 30 (U.S. Sieve Series) |
| Density | 0.48 g./ml. |
| Total Pore Volume | 0.85 ml./gram |
| Pore Volume Distribution (%) | |
| >25 A. | 67 |
| 15–25 A. | 15 |
| <15 A. | 18 |

The quantity of activated carbon that is used is not critical and depends to a large degree on the amount of $C_3$ and $C_4$ acetylenic compounds that are present in the gas stream.

The $C_3$ and $C_4$ acetylenic compounds that are adsorbed on the surface of the carbon can be desorbed by passing through the carbon a stream of inert gas, such as steam or mixtures of nitrogen and methylene chloride. This step is ordinarily and preferably carried out at atmospheric pressure and ambient temperature, but other temperatures and pressures can be used.

The gas streams that are obtained when the acetylenic compounds are desorbed from the activated carbon can be safely added to reaction vessels in which the acetylenic compounds are to be used as reactants. For example, they can be added to a dilute solution of an halogen compound to form polyhalogenated hydrocarbons. This process is described in detail in German patent application OLS 2,157,538, which was published on May 31, 1972.

The invention is further illustrated by the following examples.

EXAMPLE 1

A. A gas stream that contained 3.5 percent by weight of n-butane in nitrogen and that was maintained at 21°C. was passed through a cylindrical vessel 22.5 inches in diameter and 33 inches in height that contained 180 pounds of activated carbon (Pittsburgh Type SGL) for two hours. At the end of this time, n-butane appeared in the gas leaving the carbon bed, indicating that the carbon was saturated with it. The temperature of the carbon bed, which was 35°C. at the start of the run, rose at the rate of 1.4°C. per minute until it reached 120°C., at which temperature it remained until the flow of gas was discontinued. The butane-saturated activated carbon was cooled to 35°C.

B. A gas stream that contained 3.5 percent by weight of $C_4$ compounds (55% n-butane, 30% diacetylene, and 15% vinylacetylene) and that was maintained at 17°C. was passed through the bed of n-butane-saturated activated carbon whose preparation is described in Example 1A at the rate of 2.7 pounds of $C_4$ compounds per hour for two hours. At the end of this time, $C_4$ acetylenic compounds appeared in the gas leaving the carbon bed. During the passage of the gas stream through it, the bed of n-butane-saturated-activated carbon remained at about 40°C.

The saturated carbon was subjected to a rapid steam purge at atmospheric pressure until all of the $C_4$ compounds had been removed from it. The effluent gas contained about 40 percent by weight of a mixture of $C_4$ compounds that contained about 55% of n-butane, 30% of diacetylene, and 15% of vinylacetylene.

EXAMPLE 2

A. Liquid n-butane was fed to a bed that contained 180 pounds of activated carbon (Pittsburgh Type SGL) and allowed to evaporate. The bed temperature rose to 125°C. The temperature of n-butane leaving the bed was 5°C. The flow of n-butane from the bed continued for about one hour during which time the bed temperature fell to about 80°C. The carbon bed was cooled to 37°C. by passing cold (12°C.) nitrogen through it. When additional liquid n-butane was fed to the bed, its temperature rose to 46°C. The bed was again cooled to 37°C. with cold nitrogen.

B. A gas stream that contained 3.5 percent by weight of $C_4$ compounds (55% n-butane, 30% diacetylene, and 15% vinylacetylene) was passed through the butane-saturated carbon bed prepared by the procedure of Example 2A at the rate of 2.7 pounds of $C_4$ compounds per hour for two hours. During the run the tempeature of the carbon bed remained about 40°C.

The saturated carbon was subjected to a rapid steam purge at atmospheric pressure until all of the $C_4$ compounds had been removed from it. The effluent gas contained about 50 percent by weight of a mixture of $C_4$ compounds that contained 55% n-butane, 30% diacetylene, and 15% vinylacetylene.

COMPARATIVE EXAMPLE

A gas stream that contained 3.5% of $C_4$ compounds (55% n-butane, 30% diacetylene, and 15% of vinylacetylene) and that was maintained at 17°C. was passed at the rate of 2.7 pounds of $C_4$ compounds per hour through a bed that contained 180 pounds of activated carbon (Pittsburgh Type SGL). The bed temperature, which was 34°C. at the start of the run, rose at the rate of about 1.4°C. per minute until after about 2 hours it had reached 175°C. The flow of gas was discontinued, but the temperature rose to 285°C. in the next 30 minutes. Water cooling and a cold nitrogen purge were used, but after 1.5 hours the temperature of the bed was still above 250°C. Steam was used to cool the bed and to desorb the $C_4$ acetylenic compounds. After removal of these acetylenic compounds, the carbon was cooled rapidly with cold nitrogen to 55°C.

Deposits of polymers of diacetylene and vinylacetylene were found on the surface of the carbon.

EXAMPLE 3

A. A gas stream that contained 3.7 mole percent of diacetylene, 1.3 mole percent of vinylacetylene, 1.7 mole percent of methylacetylene and allene and 5.0 mole percent of n-butane was passed at atmospheric pressure and ambient temperature through a primary carbon bed that contained 400 grams of activated carbon that had been presaturated with n-butane by the procedure described in Example 2A. The gases leaving this bed were passed through a secondary bed that contained 400 grams of activated carbon that had not been presaturated with n-butane. The gas stream was passed through the carbon beds until the gas leaving the primary bed contained vinylacetylene and diacetylene. The carbon in the primary bed was subjected to a rapid steam purge until all of the $C_4$ carbons had been removed from it. The effluent gas contained about 3.7 mole percent of diacetylene, 1.3 mole percent of vinylacetylene, and 5 mole percent of n-butane.

B. The procedure described in Example 3A was repeated except that the activated carbon in the primary bed had not been presaturated with n-butane.

C. The gas streams resulting from the procedures described in Examples 3A and 3B were introduced at 0.8 atmosphere pressure and ambient temperature into a solution that contained 2 percent by weight of bromine in carbon tetrachloride. The bromination of the unsaturated hydrocarbons took place rapidly and smoothly, and a quantitative yield of brominated compounds was obtained. The composition of the brominated products was as follows, as determined by mass spectroscopy:

| Starting Material | Product of Ex. 3A (Carbon presaturated with n-butane) | Product of Ex. 3B (Carbon not presaturated with n-butane) |
|---|---|---|
| Composition (% by weight) | | |
| $C_3H_4Br_2$ | 0.2 | 12.2 |
| $C_3H_5Br_3$ | 0.5 | 3.3 |
| $C_4H_4Br_4$ | 97.1 | 82.6 |
| $C_4H_2Br_6$ | 2.2 | 2.9 |

From these results it is clear that the use of carbon that had been presaturated with n-butane resulted in a cleaner separation of the $C_4$ acetylenic hydrocarbons from the $C_3$ acetylenic hydrocarbons than was obtained when untreated carbon was used.

What is claimed is:

1. In the process for the separation of diacetylene and vinylacetylene from a hydrocarbon pyrolysis gas that contains from 1 to 10 mole percent of said compounds wherein said hydrocarbon pyrolysis gas is passed through a bed of activated carbon until the surface of the carbon is saturated with adsorbed $C_4$ acetylenic hydrocarbons and a stream of inert gas is passed through the bed of saturated activated carbon thereby desorbing said acetylenic hydrocarbons and forming a gas stream that contains about 30 to 50 mole percent of $C_4$ acetylenic hydrocarbons in said inert gas, the improvement that comprises saturating the surface of the activated carbon with an inert, non-explosive compound that has carbon adsorption characteristics similar to those of diacetylene and vinylacetylene and thereafter cooling said activated carbon before the hydrocarbon pyrolysis gas is passed into the bed of activated carbon.

2. The process of claim 1 wherein the inert, non-explosive compound with which the activated carbon is presaturated is n-butane.

3. The process of claim 1 wherein the activated carbon is presaturated by treatment with a gas stream that contains 1 to 5% of n-butane in nitrogen and cooled to a temperature in the range of about 25° to 60°C. before it is contacted with the hydrocarbon pyrolysis gas.

4. The process of claim 3 wherein the presaturated activated carbon is cooled to 30° to 40°C. before it is contacted with the hydrocarbon pyrolysis gas.

5. The process of claim 1 wherein the activated carbon is presaturated by adding liquid n-butane to it, allowing the n-butane to evaporate, and cooling the n-butane-saturated carbon to a temperature in the range of about 25° to 60°C. before it is contacted with the hydrocarbon pyrolysis gas.

6. The process of claim 1 wherein the activated carbon is presaturated by adding liquid n-butane to the carbon, allowing the n-butane to evaporate, cooling the treated carbon to a temperature in the range of about 25° to 60°C., adding additional liquid n-butane to the carbon, allowing the added n-butane to evaporate, and cooling the n-butane-saturated carbon to 30° to 40°C. before it is contacted with the hydrocarbon pyrolysis gas.

7. The process of claim 1 wherein the hydrocarbon pyrolysis gas is mixed with about 30 percent to 70 percent of its weight of an inert, non-explosive gas that has carbon adsorption characteristics similar to those of diacetylene and vinylacetylene and the resulting gas mixture is passed into the bed of presaturated carbon.

8. The process of claim 7 wherein the hydrocarbon pyrolysis gas is mixed with about 45 percent to 60 percent of its weight of n-butane.

9. In the process for the separation of acetylenic hydrocarbons having 3 or 4 carbon atoms from a pyrolysis gas stream that contains from 1 to 10 mole percent of said compounds wherein (a) said hydrocarbon pyrolysis gas is passed into a first bed of activated carbon and the gas leaving the first bed is passed into a second bed of activated carbon until the surface of the carbon in the first bed is saturated with diacetylene and vinylacetylene and the surface of the carbon in the second bed is saturated with methylacetylene and allene and (b) a stream of inert gas is passed through each of said beds of saturated activated carbon thereby desorbing said acetylenic hydrocarbons and forming gas streams that contain about 30 to 50 mole percent of the acetylenic hydrocarbons in said inert gas, the improvement that comprises saturating the surface of the activated carbon in the first bed of activated carbon with an inert, non-explosive gas that has carbon adsorption characteristics similar to those of diacetylene and vinylacetylene and thereafter cooling said activated carbon before the hydrocarbon pyrolysis gas is passed into the beds of activated carbon.

10. The process of claim 9 wherein the surface of the activated carbon in the first bed of activated carbon is presaturated with n-butane.

11. The process of claim 9 wherein the activated carbon in the first bed of activated carbon is presaturated by adding liquid n-butane to it, allowing the n-butane to evaporate, and cooling the n-butane-saturated carbon to a temperature in the range of about 25° to 60°C. before it is contacted with the hydrocarbon pyrolysis gas.

12. The process of claim 9 wherein the hydrocarbon pyrolysis gas is mixed with about 30 percent to 70 percent of its weight of an inert, non-explosive gas that has carbon adsorption characteristics similar to those of the $C_4$ acetylenic hydrocarbons and the resulting gas mixture is passed into the first bed of presaturated activated carbon.

13. The process of claim 12 wherein the hydrocarbon pyrolysis gas is mixed with about 45 percent to 60 percent of its weight of said inert, non-explosive gas.

14. The process of claim 12 wherein the hydrocarbon pyrolysis gas is mixed with about 45 percent to 60 percent of its weight of n-butane and the resulting gas mixture is passed into the first bed of activated carbon which has been presaturated with n-butane.

* * * * *